Feb. 19, 1935.  A. N. LUCAS  1,991,562
JOURNAL BEARING
Filed March 18, 1930   2 Sheets-Sheet 1
Fig. I.
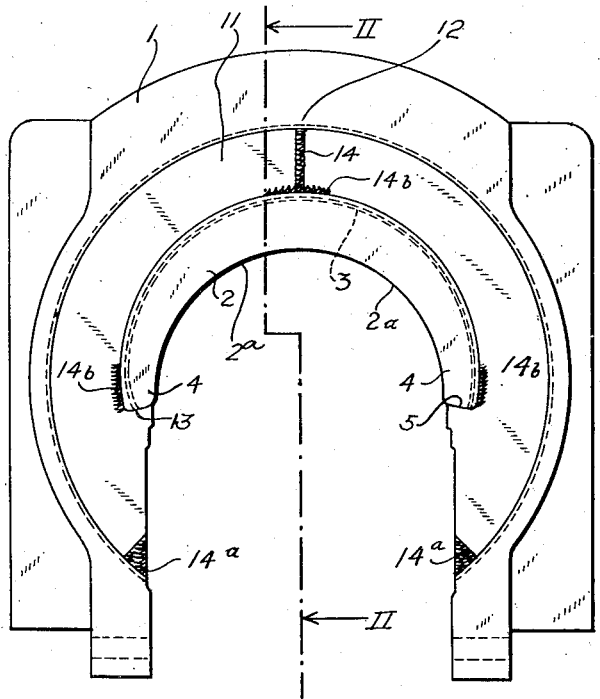
Fig. II.
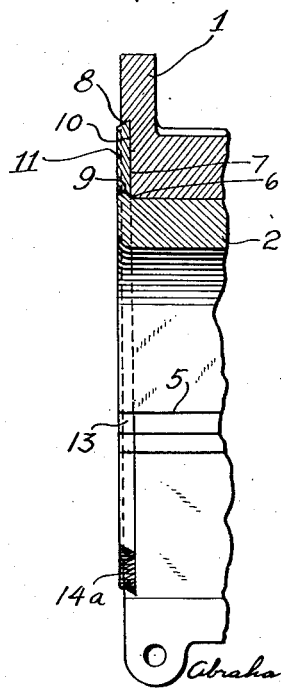
Abraham N. Lucas, INVENTOR,
BY
Byrne Townsend & Potter, ATTORNEYS Feb. 19, 1935.  A. N. LUCAS  1,991,562
JOURNAL BEARING
Filed March 18, 1930   2 Sheets-Sheet 2
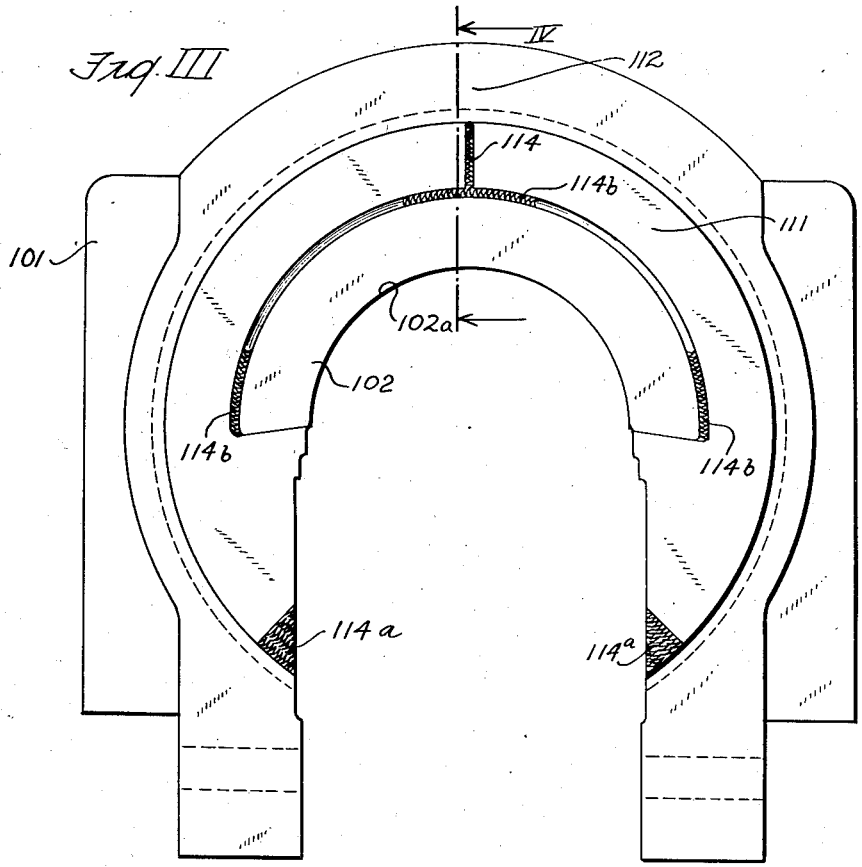
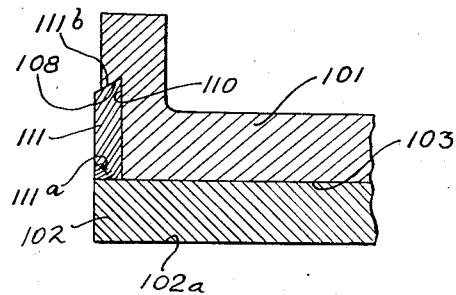
Abraham N. Lucas, INVENTOR,
BY
Byrne Townsend & Potter, ATTORNEYS.

Patented Feb. 19, 1935

1,991,562

UNITED STATES PATENT OFFICE 1,991,562

JOURNAL BEARING

Abraham N. Lucas, Wauwatosa, Wis., assignor to The Oxweld Railroad Service Company, a corporation of Delaware Application March 18, 1930, Serial No. 436,858

9 Claims. (Cl. 308—165)

My invention relates to a journal bearing adapted to receive the end thrust of the journal and more particularly to the construction of the thrust bearing members and the method of building up and replacing these members when worn.

In railway service, bearings of the above type are used on locomotive driving journals. The bearings comprise a journal box into which a crown brass or journal bearing member is fitted for supporting the weight of the locomotive. Bearing metal is applied to the end of the journal box to receive the side thrust of the locomotive transmitted to the bearing metal through a bearing shoulder on the driving wheel. The bearing surfaces of both the end thrust and journal bearing members are worn out in service and it is necessary to renew these surfaces at frequent intervals.

Heretofore, it has been customary to apply at least a portion of the thrust bearing metal to the end of the journal box by pouring molten bearing metal in a dovetail groove formed in the end face of the journal box. The root of the bearing metal ran into this groove which held the bearing metal on the face of the box after the metal was poured and had solidified. The thrust bearing metal was then machined to provide a smooth bearing surface and bored to size to receive the end of the crown brass which was pressed into the journal box.

This method of applying the thrust bearing metal has several disadvantages. Among them are: the metal is sometimes cracked and loose on the face of the bearing due to shrinkage of the metal while cooling, and some of the metal is wasted in the pouring and machining operations.

Another disadvantage is encountered in removing the metal from the dovetail groove when the face of the bearing metal has been worn down. In removing the metal, the edges of the groove in the face of the journal box are often injured to such an extent that they have to be redressed on a machine.

Therefore, one of the objects of my invention is to construct the end face of a journal box so that a preformed thrust bearing plate can be inserted in a groove in the face of the box.

Another object of my invention is to construct the end face of the journal box and a thrust bearing plate so that the plate can be secured to the face of the box and be removed therefrom without injury to the face of the box or to the journal bearing member.

Another object of my invention is to provide a method and a means of applying the thrust bearing metal to the face of the journal box in such a manner that little or no machining is required after the metal is applied.

Another object of my invention is to construct the end of the journal bearing so that the thrust bearing plate can be removed from the journal box without completely removing and renewing the crown brass or journal bearing member.

Another object of my invention is to replace the worn surface of the thrust bearing members with deposited weld metal without removing the journal bearing member if it is good for further service.

These and other objects of my invention will be more clearly understood from the following description and accompanying drawings, in which Figure I is an end view of my journal bearing.

Figure II is a sectional view on line II—II of Figure I, and

Figure III is an end view of a modification of my journal bearing, and

Figure IV is a sectional view of the modification on line IV—IV of Figure III.

The bearings illustrated in the drawings are designed particularly for the main driving axle of locomotives, but they may be used on car journals and like places. Referring to Figs. I and II the weight of the locomotive is supported on the housing or journal box 1. A crown brass or journal bearing member 2 fits into an arcuate socket 3 in the journal box 1 and it is supported on a journal, not shown. The foot 4 of the arch of the crown brass 2 rests on a ledge 5 at the bottom of the socket 3. The outer end of the crown brass 2 is provided with a shoulder 6 which rests on the bottom of an arcuate recess 7 formed in the end face of the journal box. The outer edge of the recess 7 is in the form of an undercut groove 8. The outer edge or periphery 9 of the shoulder 6 on the end of the crown brass 2 is circular and is inwardly beveled. When the crown brass 2 is placed in the journal box 1, its circular beveled edge 9 is spaced from the groove 8, of the recess 7 in the journal box. A dovetailed groove 10 is thus formed between the outer edge 9 of the shoulder 6 on the crown brass 2 and the outer edge 8 of the recess 7.

A thrust bearing plate 11 having beveled edges snugly fits in the dovetail groove 10 between the crown brass 2 and the outer edge 8 of the recess 7 in the journal box 1. The plate 11 is split in half at the crown 12 of the bearing so that the plate can be conveniently inserted in the groove 10. Each half of the plate 11 is provided with a shoulder 13 which fits against the foot 4 of the arch of the crown brass 2 while the top end of the halves meet at the crown 12 of the bearing. The adjacent top edges of the halves are beveled to provide a groove therebetween which is filled with weld metal 14, preferably bronze. Weld metal 14a of a similar character is deposited at the lower end of each half of the thrust bearing plate 11 to maintain the halves in the dovetail groove 10. Additional weld metal 14b may also be deposited in recesses provided between the meeting edge of the plate 11 and the crown brass 2.

In Figs. I and II the crown brass 2 has a thicker wall at the crown 12 of the bearing than the wall on the sides of the bearing and the width of the groove 10 and the width of the two-part plate 11 which fits within the groove is narrower at the top or crown than on the sides of the journal. The width of the groove 10 and the plate 11 is tapered by locating the circle center of the outer edge 8 of the groove and the adjacent edge of the plate 11 on a vertical line through the center of the crown of the bearing at a point below the circle center of the inner edge 9 of the groove and the adjacent edge of the plate 11 located on the same vertical.

Due to the tapered construction of the plate and the upwardly converging edges of the groove just described, the removal of the plate from the groove is facilitated and it makes it possible to remove the plate from the groove while the crown brass 2 is partially inserted in the box. This latter feature becomes important when the thrust bearing plates are worn out and the crown brass is good and it is desirable to retain it for further service.

To replace the thrust bearing plates 11 under the above conditions, the crown brass 2 is pressed outwardly about one quarter of an inch to relieve the tension on the thrust plate 11. The ends of the old plate 11 are then cut loose from the box 1 and the halves of the plate are cut loose from each other and from the crown brass where they are welded together. Each half of the plate may be removed by rotating it downwardly until the narrow upper portion of the halves have traveled into the lower wider portion of the groove 10 where the beveled edges of the plate will clear the undercut portion of the groove 10 and allow the plate to be removed therefrom in halves.

The halves of the new thrust bearing plate 11 may then be inserted in the groove 10, by starting the narrow portion of the halves at the bottom of the groove 10 and then rotating them upwardly until they meet. The plate is locked in place by pressing the beveled edge 9 of the journal bearing member down on the beveled edge of the plate 11. The lower ends of the plate 11 are then welded to the recess in the box 1 and the upper ends of the halves are welded together as before. The end of the journal bearing member may be built up with weld metal such as manganese bronze to the surface of the inserted plate and then the deposited metal may be machined off to obtain a smooth bearing surface.

When it is necessary to replace both the thrust bearing plates and the crown brass at the same time, the same operations as the above may be followed except that the crown brass may be pressed completely out before removing the plates and the plates may be inserted in the groove 10 before the crown brass is inserted in the socket 3. In this case, the shoulder 6 on the new crown brass and plate 11 will be of the same thickness and therefore it will not be necessary to build up the new crown brass with weld metal, also very little machining, if any, will be required after the bearing metal has been pressed and welded into place.

In Figs. III and IV, I have shown a modification of my invention similar to that shown in Figs. I and II and the parts of this modification which correspond to those in Figs. I and II will be designated by the same reference numeral with the addition of 100, and they will not be described in detail.

In this modification, the circle centers of the circles forming the journal bearing surface 102a of the crown brass 102, the arch of socket 103 in the journal box 101, and the outer edge 108 of the groove 110 within which the two-part thrust plate 111 fits are located at the same point. In such a construction the walls of the crown brass 102 and the groove 110 formed between the end of the crown brass and journal box 101, are of uniform thickness and width respectively.

For convenience in manufacture, the outer shoulder 6 shown in Figs. I and II on the end of the crown brass may be eliminated and the axial line of this surface of the crown brass may be straight as shown in Fig. IV. The edges 111a and 111b of the thrust plate 111 are beveled. The outer edge 111b of the plate fits against the edge 108 of the groove 110 and the inner beveled edge 111a fits against the slightly protruding end of the crown brass 102. The halves of the plate 111 are welded together by the deposited metal 114, and they are welded to the box 101 with deposited metal 114a. Additional weld metal 114b is deposited at intervals between the protruding end of the crown brass 102 and the bevel edge 111a to secure this edge of the plate to the crown brass.

I have shown in one modification a crown brass having thicker walls at the crown of the bearing than on the sides in combination with a tapered thrust bearing plate, and I have shown in another modification a crown brass having walls of uniform thickness in combination with a thrust bearing plate of uniform width. I do not wish to be limited to the construction shown herein, as either form of thrust bearing plate may be used with either form of crown brass shown, and other changes may be made without departing from the scope of the invention as defined in the appended claims.

I claim:

1. A thrust bearing comprising a housing having a recessed end face; a divided removable thrust bearing plate converging in width toward the abutting edges thereof secured within said recess.

2. A journal thrust bearing comprising a housing having an end face adapted to receive the end thrust of the journal, said end face having a substantially circular recess converging in width toward the top thereof formed therein, and a removable preformed end thrust plate secured in said recess.

3. A journal bearing comprising a journal box adapted to receive the end thrust of the journal, a crown brass fitting within said box, a preformed thrust bearing plate converging in width toward the top thereof secured to the end of the journal box between a projection thereon and the outer end of said crown brass.

4. A journal bearing comprising a journal box having an end face adapted to receive the end thrust of the journal, said end face of said box having a recess formed therein, a thrust bearing plate fitting in said recess, a crown brass fitting within said box, an end bearing face on said crown brass having an outer shoulder overlapping the inner edge of said thrust bearing plate to maintain the plate within said recess.

5. A journal bearing comprising a journal box having an end face adapted to receive the end thrust of the journal, said end face of said box having an annular recess formed therein, a two-part thrust bearing plate fitting in said recess, a crown brass fitting within said box, an end bearing face on said crown brass having an outer shoulder overlapping the inner edge of said thrust bearing plate to maintain the plate within said recess.

6. A journal bearing comprising a journal box having an end face adapted to receive the end thrust of the journal, said end face having an annular recess formed therein with an undercut outer edge, a crown brass fitting within said box, an end bearing face on said crown brass, said end face of said crown brass having an outer undercut shoulder opposite to and spaced from said undercut edge of said recess and forming in conjunction therewith an annular dovetail groove, and a thrust bearing plate fitting within said groove.

7. A journal bearing comprising a journal box having an end face adapted to receive the end thrust of the journal, said end face having an annular recess formed therein with an undercut outer edge, a crown brass fitting within said box, an end bearing face on said crown brass, said end face of said crown brass having an outer undercut shoulder opposite to and spaced from said undercut edge of said recess and forming in conjunction therewith an annular dovetail groove, and a two-part thrust bearing plate fitting within said groove.

8. A journal bearing comprising a journal box having an end face adapted to receive the end thrust of the journal, said end face having an annular recess formed therein with an undercut outer edge, a crown brass fitting within said journal box, said crown brass having an annular outer shoulder overhanging said end face of said box and forming in conjunction with said recess in said box an arcuate dovetail groove converging towards the top of the arch, and a removable two-piece arcuate thrust bearing plate fitting within said groove.

9. A journal bearing comprising a journal box having an end face adapted to receive the end thrust of the journal, said end face having an annular recess formed therein with an undercut outer edge, a crown brass fitting within said journal box, said crown brass having an annular outer shoulder overhanging said end face of said box and forming in conjunction with said recess in said box an arcuate dovetail groove converging towards the top of the arch, a removable two-piece arcuate thrust bearing plate fitting within said groove, and weld metal deposited at the foot of the thrust bearing plate to weld the plate to the end face of said journal box.

ABRAHAM N. LUCAS.